(12) United States Patent
Ikeda

(10) Patent No.: US 11,784,006 B2
(45) Date of Patent: *Oct. 10, 2023

(54) MULTILAYER CERAMIC CAPACITOR

(71) Applicant: Murata Manufacturing Co., Ltd., Nagaokakyo (JP)

(72) Inventor: Mitsuru Ikeda, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/958,482

(22) Filed: Oct. 3, 2022

(65) Prior Publication Data

US 2023/0027489 A1 Jan. 26, 2023

Related U.S. Application Data

(63) Continuation of application No. 17/232,351, filed on Apr. 16, 2021, now Pat. No. 11,495,411.

(30) Foreign Application Priority Data

Apr. 22, 2020 (JP) ................................ 2020-076066

(51) Int. Cl.
*H01G 4/30* (2006.01)
*H01G 4/12* (2006.01)
(Continued)

(52) U.S. Cl.
CPC ............. *H01G 4/30* (2013.01); *H01G 4/012* (2013.01); *H01G 4/1227* (2013.01); *H01G 4/248* (2013.01)

(58) Field of Classification Search
None
See application file for complete search history.

(56) References Cited

U.S. PATENT DOCUMENTS 9,099,246 B1 * 8/2015 Kitano .................. H01G 4/012
9,099,247 B1 * 8/2015 Kitano ................. H01G 4/1227
(Continued)

FOREIGN PATENT DOCUMENTS

| CN | 107452462 A | 12/2017 |
| JP | 2019102578 A | 6/2019 |
| KR | 1020150134274 A | 12/2015 |

OTHER PUBLICATIONS

Ikeda, "Multilayer Ceramic Capacitor", U.S. Appl. No. 17/232,351, filed Apr. 16, 2021.
Office Action in CN202110427447.7, dated Apr. 3, 2023, 7 pages.

*Primary Examiner* — Dion R. Ferguson
(74) *Attorney, Agent, or Firm* — Keating & Bennett, LLP

(57) ABSTRACT

A multilayer ceramic capacitor includes a multilayer body and external electrodes. The multilayer body includes an inner layer portion including dielectric layers and internal electrode layers alternately stacked, and first and second outer layer portions on opposite sides of the inner layer portion in a stacking direction, side gap portions on opposite sides in a width direction, main surfaces on opposite sides in the stacking direction, side surfaces on opposite sides in the width direction, and end surfaces on opposite sides in a length direction. Each external electrode is provided at one end surfaces of the multilayer body, and extends from the end surface to a portion of the main surface. A difference in location between ends at the side surface of two adjacent internal electrode layers is about 0.5 μm or less. The second outer layer portion is thicker than the first outer layer portion.

17 Claims, 9 Drawing Sheets

(51) Int. Cl.
*H01G 4/248* (2006.01)
*H01G 4/012* (2006.01)

(56) References Cited

U.S. PATENT DOCUMENTS

| | | | | |
|---|---|---|---|---|
| 10,903,007 B2* | 1/2021 | Ono | | H01G 4/224 |
| 10,950,387 B2* | 3/2021 | Yeon | | H01G 4/228 |
| 10,971,308 B2* | 4/2021 | Park | | H01G 2/065 |
| 11,170,936 B2* | 11/2021 | Park | | H01G 4/1227 |
| 11,495,411 B2* | 11/2022 | Ikeda | | H01G 2/065 |
| 2012/0307417 A1* | 12/2012 | Kim | | H01G 4/012 361/321.2 |
| 2013/0319741 A1* | 12/2013 | Ahn | | H05K 1/0271 361/728 |
| 2014/0020942 A1* | 1/2014 | Cho | | H05K 1/181 361/301.4 |
| 2014/0083755 A1* | 3/2014 | Lee | | H01G 4/12 338/21 |
| 2014/0131082 A1* | 5/2014 | Ahn | | H01G 4/30 361/301.4 |
| 2014/0151102 A1* | 6/2014 | Lee | | H01G 4/002 361/301.4 |
| 2014/0166351 A1* | 6/2014 | Lee | | H05K 3/3442 174/258 |
| 2014/0168852 A1* | 6/2014 | Park | | H01G 4/012 361/303 |
| 2014/0301013 A1* | 10/2014 | Kim | | H01G 4/01 29/25.03 |
| 2015/0062775 A1* | 3/2015 | Shibasaki | | H01G 4/012 361/301.4 |
| 2015/0340155 A1* | 11/2015 | Fukunaga | | H01G 4/30 361/301.4 |
| 2016/0211074 A1 | 7/2016 | Gu et al. | | |
| 2017/0018363 A1* | 1/2017 | Tanaka | | H01G 4/005 |
| 2017/0243697 A1* | 8/2017 | Mizuno | | H01G 4/1227 |
| 2017/0301464 A1* | 10/2017 | Terashita | | H01G 4/12 |
| 2017/0352467 A1 | 12/2017 | Kakiuchi et al. | | |
| 2018/0019060 A1* | 1/2018 | Sugita | | H01G 4/30 |
| 2018/0108483 A1* | 4/2018 | Sasabayashi | | H01G 4/248 |
| 2018/0233286 A1* | 8/2018 | Yu | | H01G 4/33 |
| 2019/0164693 A1* | 5/2019 | Ono | | H01G 4/30 |
| 2019/0304683 A1* | 10/2019 | Terashita | | H01G 4/228 |
| 2020/0027661 A1* | 1/2020 | Park | | H01G 4/12 |
| 2020/0075242 A1* | 3/2020 | Kang | | H01G 4/232 |
| 2020/0075258 A1* | 3/2020 | Park | | H01G 4/224 |
| 2020/0118747 A1* | 4/2020 | Muramatsu | | H01G 4/012 |
| 2021/0020379 A1* | 1/2021 | Ono | | H01G 4/224 |
| 2021/0225594 A1* | 7/2021 | Hashimoto | | H01G 4/232 |
| 2021/0335541 A1* | 10/2021 | Ikeda | | H01G 2/065 |
| 2021/0335548 A1* | 10/2021 | Ikeda | | H01G 4/012 |
| 2021/0335549 A1* | 10/2021 | Ikeda | | H01G 4/012 |
| 2021/0335551 A1* | 10/2021 | Ikeda | | H01G 2/065 |
| 2022/0013291 A1* | 1/2022 | Nishisaka | | H01G 4/1227 |

* cited by examiner

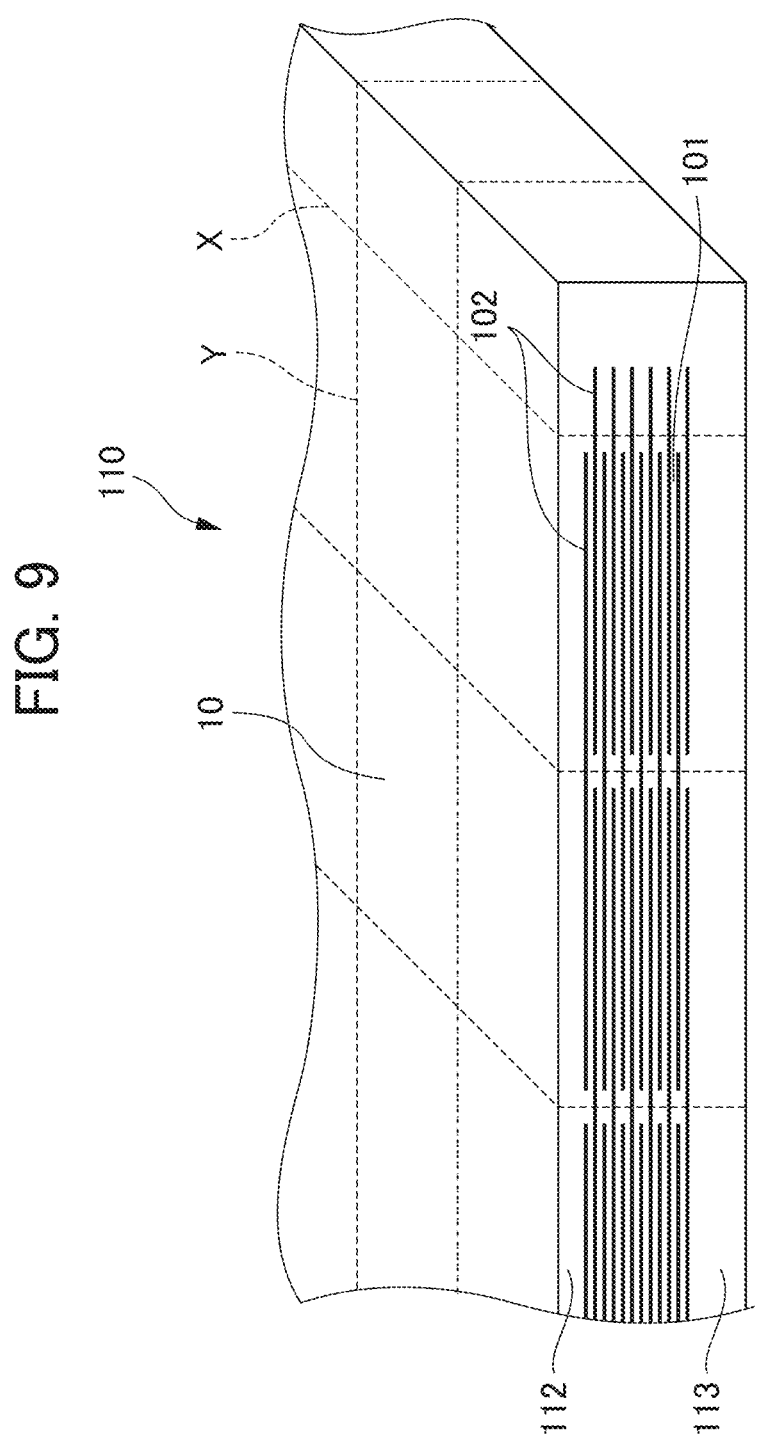

MULTILAYER CERAMIC CAPACITOR

CROSS REFERENCE TO RELATED APPLICATIONS

This application claims the benefit of priority to Japanese Patent Application No. 2020-076066 filed on Apr. 22, 2020. The entire contents of this application are hereby incorporated herein by reference.

BACKGROUND OF THE INVENTION

1. Field of the Invention

The present invention relates to a multilayer ceramic capacitor.

2. Description of the Related Art

Recently, a large-capacitance and small-size multilayer ceramic capacitor has been demanded. Such a multilayer ceramic capacitor includes an inner layer portion in which dielectric layers made of a ferroelectric material having relatively high dielectric constant and internal electrodes are alternately stacked. Furthermore, dielectric layers as outer layer portions are provided on the upper and lower portions of the inner layer portion alternately stacked, thereby forming a rectangular multilayer body. Furthermore, side gap portions are provided on both side surfaces of the rectangular multilayer body in the width direction, and external electrodes are provided on both end surfaces thereof in the longitudinal direction.

However, since the dielectric layers have piezoelectric and electrostrictive properties, stress and mechanical strain occur when an electric field is applied. Such stress and mechanical strain cause vibration, which is then transmitted to a substrate on which the multilayer ceramic capacitor is mounted. In this situation, the entire substrate functions as an acoustic reflecting surface, and "acoustic noise", which is a vibration sound, is generated.

In order to suppress the generation of this "acoustic noise", a multilayer ceramic capacitor is known which suppresses the transmission of vibration from the multilayer ceramic capacitor to the substrate by making the upper outer layer portion thicker than the lower outer layer portion.

However, in a case in which the multilayer ceramic capacitor is mounted on the substrate upside down, the thinner upper outer layer portion is provided on the side of the substrate. In this situation, the transmission of vibration from the multilayer ceramic capacitor to the substrate is not suppressed, and a result of which the generation of "acoustic noise" is not reduced.

Therefore, it is important to provide the multilayer ceramic capacitor correctly in the vertical direction when mounting the multilayer ceramic capacitor on the substrate.

Conventionally, in order to provide a multilayer ceramic capacitor which allows for the recognition of the vertical direction thereof, materials having different colors are used for the lower outer layer portion and the upper outer layer portion (see, for example, Japanese Unexamined Patent Application, Publication No. 2015-65414).

However, when different materials are used for the lower outer layer portion and the upper outer layer portion, peeling tends to occur between the different materials, and sufficient strength is not ensured.

SUMMARY OF THE INVENTION

Preferred embodiments of the present invention provide multilayer ceramic capacitors in each of which mounting in an intended direction is facilitated when mounting the multilayer ceramic capacitor on a substrate, and sufficient strength is ensured.

A multilayer ceramic capacitor according to a preferred embodiment of the present invention includes a multilayer body and two external electrodes. The multilayer body includes a multilayer main body including an inner layer portion in which a plurality of dielectric layers and a plurality of internal electrode layers are alternately stacked, a first outer layer portion on one side of the inner layer portion in a stacking direction, and a second outer layer portion on another side of the inner layer portion in the stacking direction, two side gap portions on opposite sides of the multilayer main body in a width direction intersecting the stacking direction, two main surfaces on opposite sides in the stacking direction, two side surfaces provided on opposite sides in the width direction, and two end surfaces provided on opposite sides in a length direction intersecting the stacking direction and the width direction, the two external electrodes each being provided at one of the two end surfaces of the multilayer body, and each extending from one of the two end surfaces to a portion of the main surface, in which a difference in location between ends at the side surface of two adjacent internal electrode layers among the internal electrode layers in the stacking direction is within about 0.5 μm, the second outer layer portion is thicker than the first outer layer portion, and in at least one of the two side gap portions, a portion in contact with the multilayer main body has a thickness of about 15 μm or less.

According to preferred embodiments of the present invention, it is possible to provide multilayer ceramic capacitors in each of which mounting in an intended direction is facilitated upon mounting the multilayer ceramic capacitor on a substrate, and sufficient strength is ensured.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 9 is a schematic perspective view of a mother block.

DETAILED DESCRIPTION OF THE PREFERRED EMBODIMENTS

Figure 1:
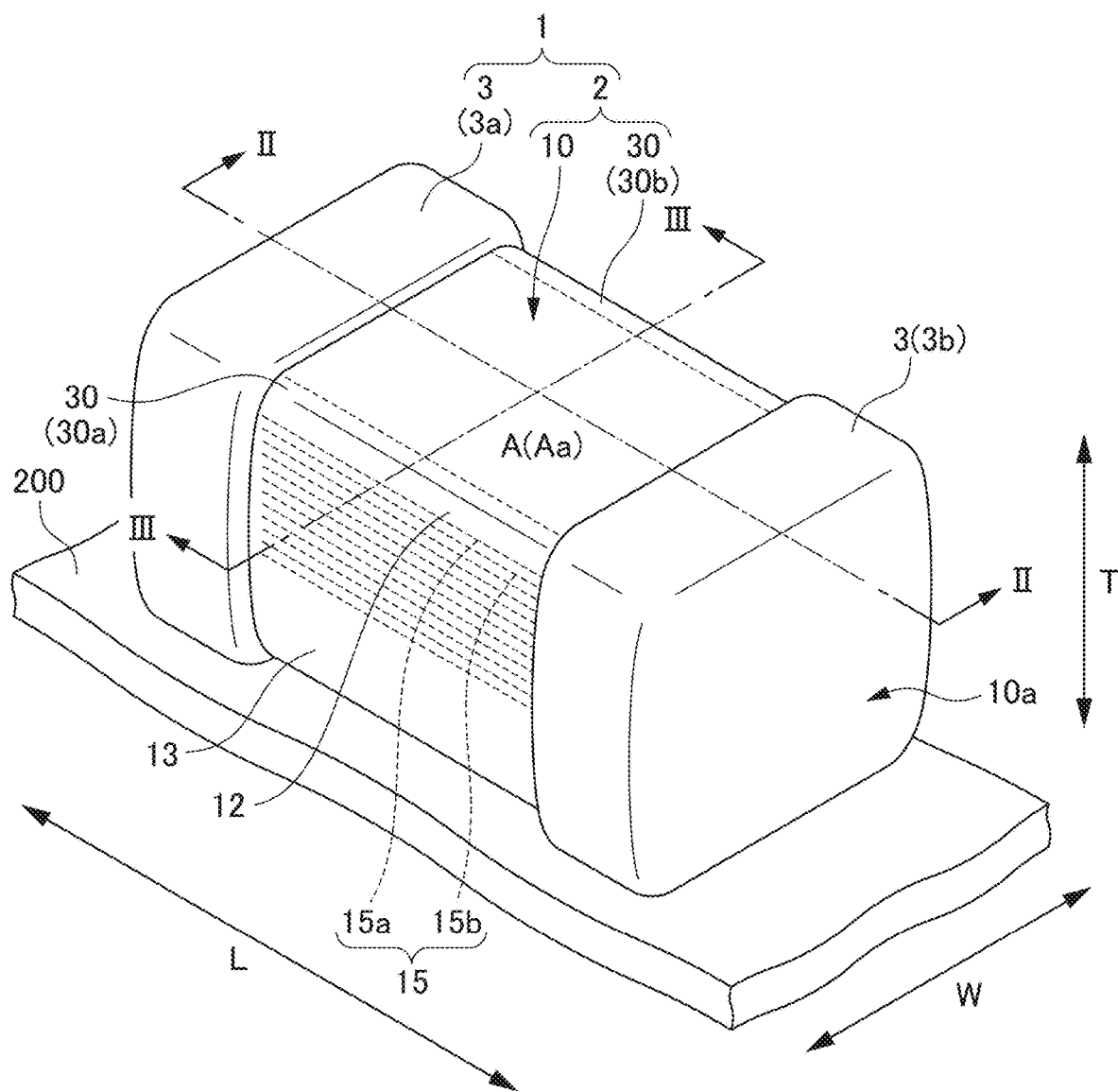
FIG. 1 is a schematic perspective view of a multilayer ceramic capacitor according to a preferred embodiment of the present invention.
Figure 2:
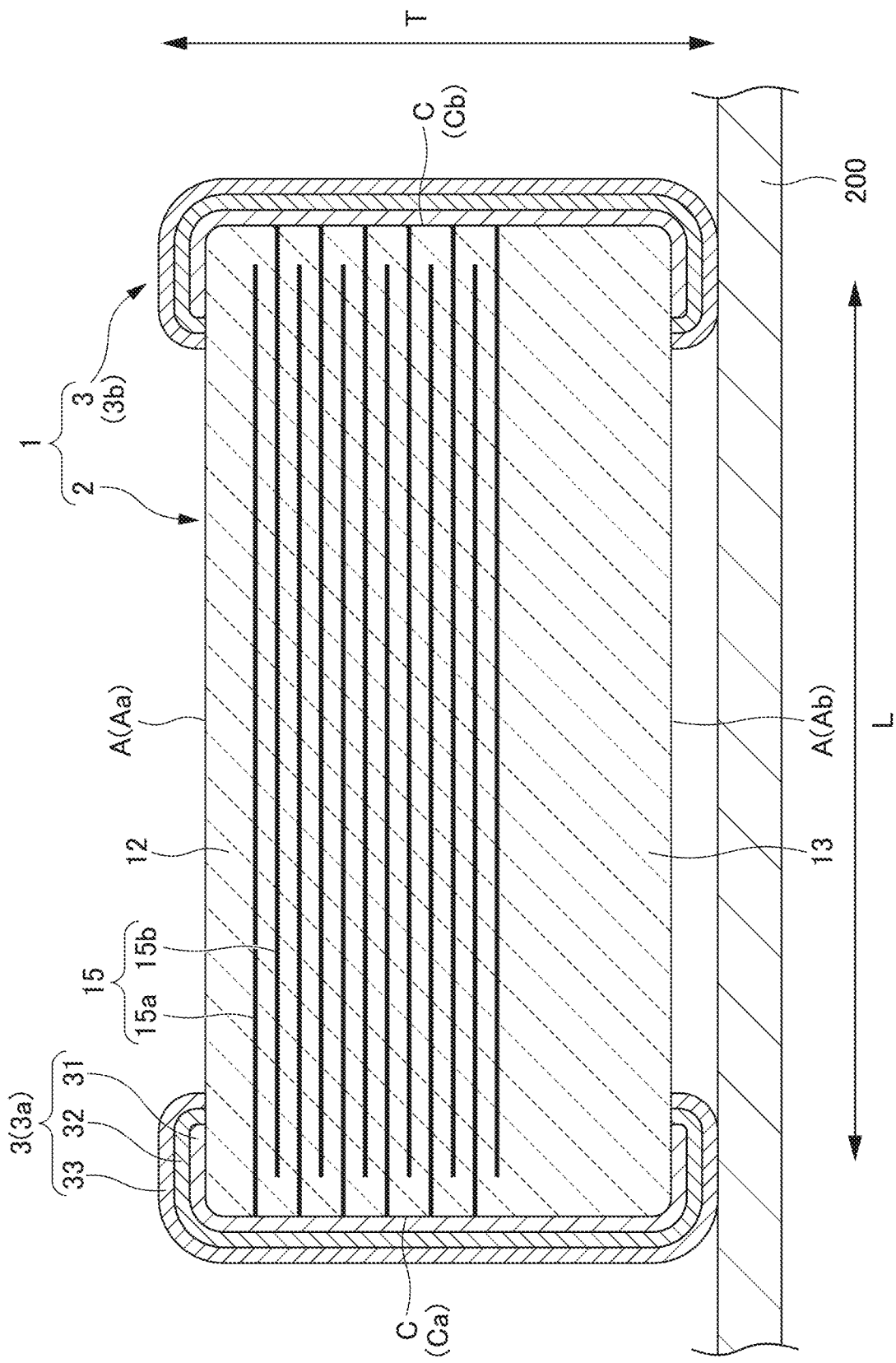
FIG. 2 is a cross-sectional view taken along the line II-II of the multilayer ceramic capacitor of FIG. 1.
Figure 3:
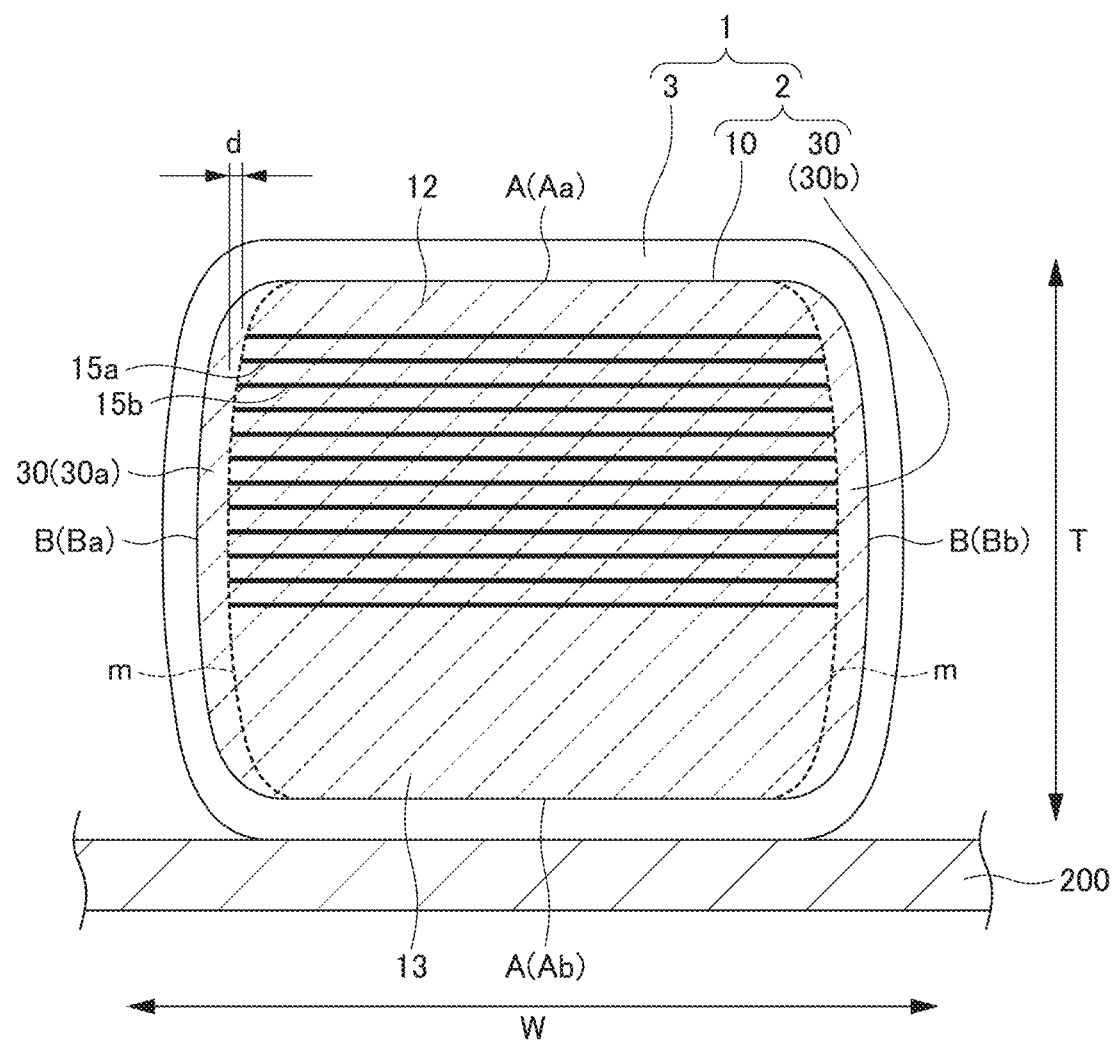
FIG. 3 is a cross-sectional view taken along the line III-III of the multilayer ceramic capacitor of FIG. 1.

Hereinafter, multilayer ceramic capacitors according to preferred embodiments of the present invention will be described with reference to the drawings. FIG. 1 is a schematic perspective view of a multilayer ceramic capacitor 1 of a preferred embodiment of the present invention, showing a state mounted on a substrate 200. FIG. 2 is a cross-sectional view taken along the line II-II of the multilayer ceramic capacitor 1 in FIG. 1. FIG. 3 is a cross-sectional view taken along the line III-III of the multilayer ceramic capacitor 1 in FIG. 1.

The multilayer ceramic capacitor 1 has a rectangular or substantially rectangular shape, and includes a multilayer body 2 and a pair of external electrodes 3 provided at both ends of the multilayer body 2. The multilayer body 2 includes an inner layer portion 11 including a plurality of sets of a dielectric layer 14 and an internal electrode layer 15.

In the following description, as a term representing the orientation of the multilayer ceramic capacitor 1, the direction in which the pair of external electrodes 3 are provided in the multilayer ceramic capacitor 1 is defined as the length direction L. The direction in which the dielectric layers 14 and the internal electrode layers 15 are stacked (or laminated) is defined as the stacking direction T. The direction intersecting both the length direction L and the stacking direction T is defined as the width direction W. It should be noted that, in the preferred embodiments, the width direction is orthogonal or substantially orthogonal to both of the length direction L and the stacking direction T.

Figure 4:
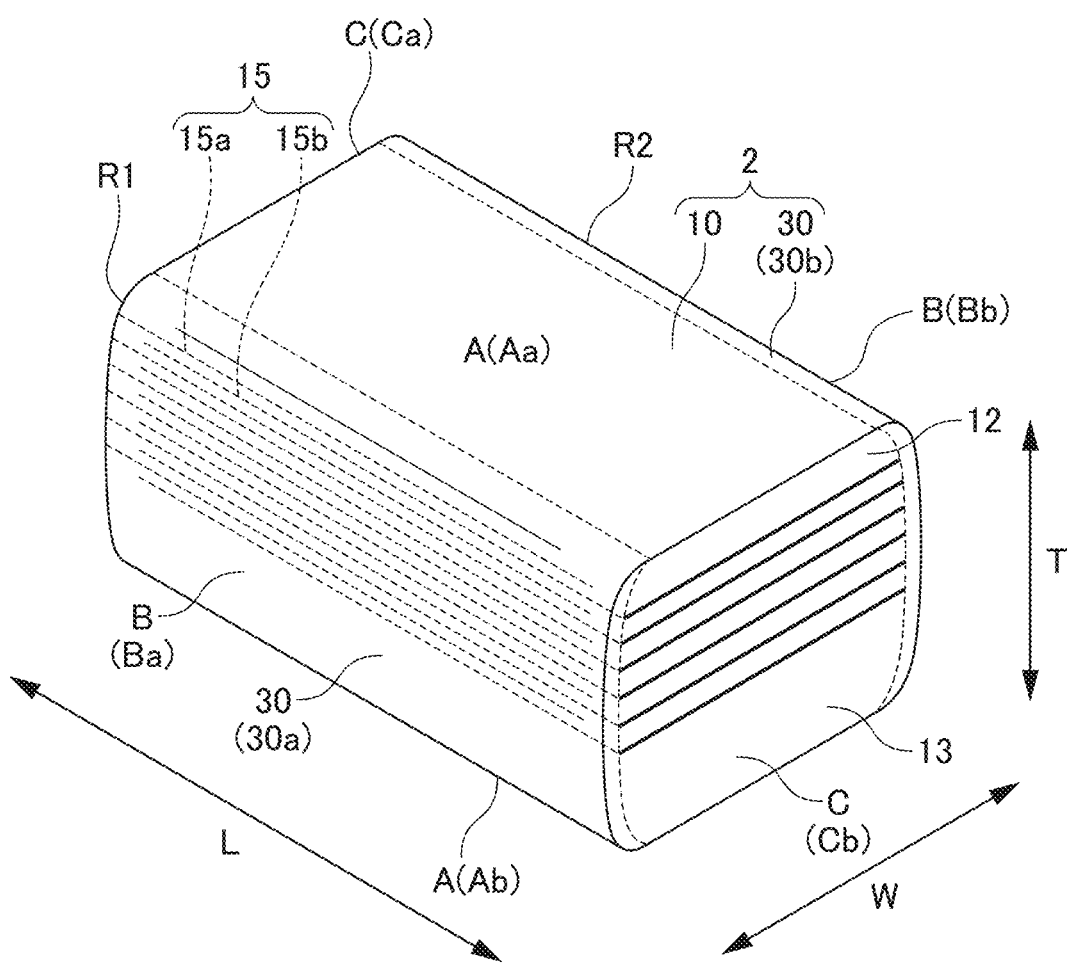
FIG. 4 is a schematic perspective view of a multilayer body according to a preferred embodiment of the present invention.
Figure 5:
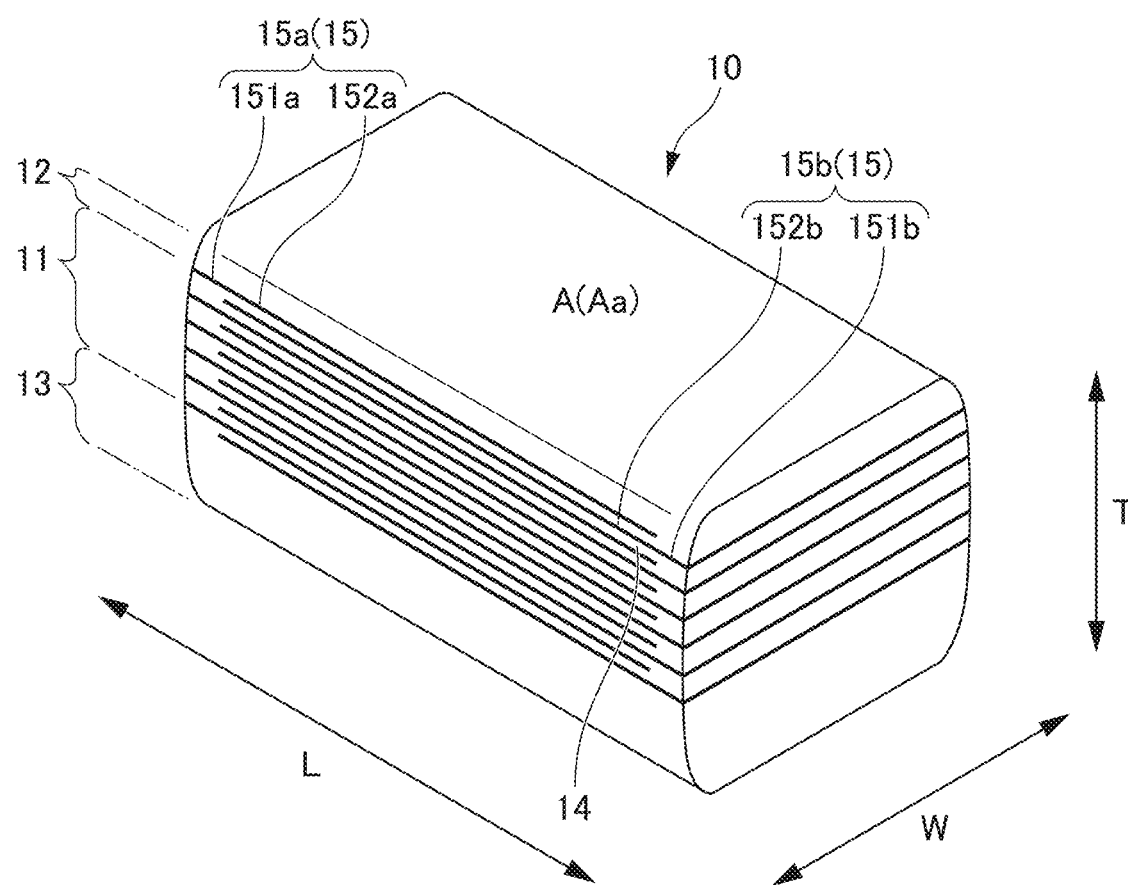
FIG. 5 is a schematic perspective view of a main body of the multilayer body in FIG. 4.

FIG. 4 is a schematic perspective view of the multilayer body 2. The multilayer body 2 includes a multilayer main body 10, and a side gap portion 30. FIG. 5 is a schematic perspective view of the multilayer main body 10.

A particle size of grains of the dielectric in the side gap portion 30 decreases from the inner layer toward the outside. The particle size of the grains is preferably, for example, about 400 nm or more and about 450 nm or less at the outermost side, and about 600 nm or more at the innermost side, and the particle size of the innermost grains is preferably, for example, about 1.5 times or more than the particle size of the outermost grains. It should be noted that, regarding the particle size of the grains, the side gap portion 30 is divided into a plurality of regions each having a dimension of about 20 nm in the width direction from the side surface side at the center portion in the stacking direction T of the side gap portion 30, and for each region, the area of the particle size is measured, and the area is converted into a circle equivalent diameter to determine the average particle diameter in each region. The region of less than about 20 nm has the average particle diameter to be defined within the region.

In the following description, among the six outer surfaces of the multilayer body 2 shown in FIG. 4, a pair of outer surfaces on opposite sides in the stacking direction T are respectively defined as a first main surface Aa and a second main surface Ab, a pair of outer surfaces on opposite sides in the width direction W are respectively defined as a first side surface Ba and a second side surface Bb, and a pair of outer surfaces on opposite sides in the length direction L are respectively defined as a first end surface Ca and a second end surface Cb.

It should be noted that, in a case in which it is not necessary to specifically distinguish the first main surface Aa and the second main surface Ab from each other, they will be collectively described as the main surface A, in a case in which it is not necessary to specifically distinguish the first side surface Ba and the second side surface Bb from each other, they will be collectively described as the side surface B, and in a case in which it is not necessary to specifically distinguish the first end surface Ca and the second end surface Cb from each other, they will be collectively described as the end surface C.

The multilayer body 2 is preferably rounded at a corner R1 and a ridge R2. The corner R1 is a portion where the main surface A, the side surface B, and the end surface C intersect. The ridge R2 is a portion where two surfaces of the multilayer body 2, i.e., the main surface A and the side surface B, the main surface A and the end surface C, or the side surface B and the end surface C intersect.

In addition, surface irregularities and the like may be provided on a portion or all of the main surface A, the side surface B, and the end surface C of the multilayer body 2. The dimension of the multilayer body 2 is not particularly limited. However, it is preferable that, for example, the dimension in the length direction L is about 0.2 mm or more and about 10 mm or less, the dimension in the width direction W is about 0.1 mm or more and about 10 mm or less, and the dimension in the stacking direction T is about 0.1 mm or more and about 5 mm or less.

As shown in FIG. 5, the multilayer main body 10 includes the inner layer portion 11, an upper outer layer portion 12 disposed adjacent to the first main surface Aa of the inner layer portion 11, and a lower outer layer portion 13 disposed adjacent to the second main surface Ab.

The inner layer portion 11 includes the plurality of sets of dielectric layer 14 and the internal electrode layer 15 which are alternately stacked along the stacking direction T.

The dielectric layer 14 preferably has a thickness of, for example, about 0.5 μm or less. The dielectric layer 14 is made of a ceramic material. As the ceramic material, for example, a dielectric ceramic including $BaTiO_3$ as a main component may be used. Furthermore, a ceramic material obtained by adding at least one of sub-components, such as, for example, Mn compounds, Fe compounds, Cr compounds, Co compounds, and Ni compounds to these main components may be used. It should be noted that the number of dielectric layers 14 including the multilayer main body 10 including the upper outer layer portion 12 and the lower outer layer portion 13 is preferably fifteen sheets or more and 700 sheets or less.

The internal electrode layer 15 includes a plurality of first internal electrode layers 15a and a plurality of second internal electrode layers 15b. The first internal electrode layers 15a and the second internal electrode layers 15b are alternately arranged. It should be noted that, when it is not necessary to distinguish the first internal electrode layer 15a from the second internal electrode layer 15b, they will be collectively described as the internal electrode layer 15.

The first internal electrode layer 15a includes a first opposing portion 152a provided opposite to the second internal electrode layer 15b, and a first lead-out portion 151a extending from the first opposing portion 152a to the side of the first end surface Ca. An end of the first lead-out portion 151a is exposed on the first end surface Ca and is electrically connected to a first external electrode 3a to be described later.

The second internal electrode layer 15b includes a second opposing portion 152b provided opposite to the first internal electrode layer 15a, and a second lead-out portion 151b extending from the second opposing portion 152b to the second end surface Cb. An end of the second lead-out portion 151b is electrically connected to a second external electrode 3b to be described later.

With the internal electrode layer 15 described above, charge is accumulated in the first opposing portion 152a of the first internal electrode layer 15a and the second opposing portion 152b of the second internal electrode layer 15b, such that the characteristics of the capacitor are provided.

As shown in FIG. 3, in the WT cross-section which is a cross section of the width direction W and the stacking direction T passing through the center or approximate center of the multilayer body 2, the positional deviation d in the stacking direction T between the ends in the width direction W of the first internal electrode layer 15a and the second internal electrode layer 15b which are adjacent vertically to each other in the stacking direction T is preferably within about 0.5 μm, for example. That is, the ends in the width direction W of the first internal electrode layer 15a and the second internal electrode layer 15b adjacent vertically to each other in the stacking direction T is the same or substantially at the same position on the width direction W, and the positions of the ends are aligned or substantially aligned in the stacking direction T.

On the other hand, in the same or similar manner, in the WT cross-section which is a cross section of the width direction W and the stacking direction T passing through the center or approximate center of the multilayer body 2 shown in FIG. 3, a line m shown by a dotted line in FIG. 3 connecting all of the ends in the width direction W of the first internal electrode layers 15a and the second internal electrode layers 15b provided adjacent to each other in the stacking direction T is slightly convex toward the outside.

In other words, the internal electrode layer 15 is pressed and extends at the center portion or approximate center portion in the stacking direction T of the first internal electrode layer 15a and the second internal electrode layer 15b. It should be noted that the convex shape can also be referred to as a drum shape. That is, the ends in the width direction W of the first internal electrode layer 15a and the second internal electrode layer 15b are at the same or substantially the same position in the width direction W when the adjacent two layers in the stacking direction T are viewed. However, when the ends along the entire length in the stacking direction T is viewed, they are in a slightly convex shape toward the outside. The reason for such convexity will be described later.

The internal electrode layer 15 is preferably made of a metallic material such as Ni, Cu, Ag, Pd, or Au, or Ag—Pd alloy, for example. The thickness of the internal electrode layer 15 is preferably about 0.5 μm or more and about 2.0 μm or less, for example. The number of the internal electrode layers 15 is preferably fifteen or more and 200 or less in total of the first internal electrode layer 15a and the second internal electrode layer 15b.

The upper outer layer portion 12 and the lower outer layer portion 13 are made of the same material as the dielectric layer 14 of the inner layer portion 11. The lower outer layer portion 13 is preferably thicker than the upper outer layer portion 12 in the stacking direction T, and the lower outer layer portion 13 is preferably, for example, about five times thicker than the upper outer layer portion 12 in the stacking direction T. For example, the thickness of the upper outer layer portion 12 is preferably, for example, about 20 μm or more and about 60 μm or less, and the thickness of the lower outer layer portion 13 is preferably, for example, about 100 μm or more and about 300 μm or less. The thickness of the upper outer layer portion 12 is preferably about 40 μm or less, and the thickness of the lower outer layer portion is preferably about 200 μm or more, for example.

The side gap portion 30 includes a first side gap portion 30a provided adjacent to the first side surface Ba of the multilayer main body 10 and a second side gap portion 30b provided adjacent to the second side surface Bb of the multilayer main body 10.

It should be noted that, in a case in which it is not necessary to specifically distinguish the first side gap portion 30a and the second side gap portion 30b from each other, they will be collectively described as the side gap portion 30.

The side gap portion 30 covers the end on the side in the width direction W of the internal electrode layer 15 which is exposed on both sides of the multilayer main body 10 along its end. The side gap portion 30 is made of the same material as the dielectric layer 14, and further includes Mg, for example, as a sintering aid. Mg migrates to the side of the internal electrode layer 15 during sintering of the side gap portion 30, such that Mg is segregated on the side of the side gap portion 30 in contact with the internal electrode layer 15. Furthermore, an interface is provided between the multilayer main body 10 and the side gap portion 30.

As shown in FIGS. 1 and 4, the thickness of the side gap portion 30 is preferably such that the internal electrode layer 15 is visually recognizable when viewed from the outside of the side gap portion 30. The visually recognizable thickness is preferably, for example, about 20 μm, and is more preferably about 10 μm or less, for example. The situation in which the internal electrode layers 15 are visually recognizable refers to a situation in which, when the multilayer ceramic capacitor 1 is viewed from the outside of the side gap portion 30, it is possible to visually recognize the internal electrode layers 15 such that the locations of the internal electrode layers can be confirmed. It should be noted that whether or not the internal electrode layer 15 can be visually recognized can also be determined by the transmittance and, for example, when the transmittance is about 20% or more, it can be determined that the internal electrode layer 15 can be visually recognized.

Furthermore, although the side gap portion 30 is a single layer in the present preferred embodiment, the present invention is not limited thereto, and the side gap portion 30 may have a two-layer structure including an outer side gap layer located on the outside and an inner side gap layer located on the side of the internal electrode layer 15.

In this case, it is preferable that the content of Si in the outer side gap layer is larger than that in the inner side gap layer. With such a configuration, it is possible to improve the strength of the side gap portion 30, thus improving the bending strength of the multilayer ceramic capacitor 1. Furthermore, since cracks or chipping hardly occur in the side gap portion 30 and thus it is possible to reduce or prevent the intrusion of moisture, it is possible to ensure the insulating property of the multilayer ceramic capacitor 1. As a result, it is possible to provide the multilayer ceramic capacitor 1 with improved reliability. Furthermore, the interface is provided between the outer side gap layer and the inner side gap layer. This interface makes it possible to alleviate the stress acting on the multilayer ceramic capacitor 1.

It should be noted that, as described above, regarding the internal electrode layer 15, a line connecting the ends of the internal electrode layers 15 on the side of the side surface B in the WT cross section is in a convex shape toward the outside. Therefore, the side gap portion 30 provided on the outside is also in a convex shape toward the outside in the WT cross section.

The external electrode 3 includes a first external electrode 3a provided on the first end surface Ca of the multilayer body 2, and a second external electrode 3b provided on the second end surface Cb of the multilayer body 2. It should be noted that, in a case in which it is not necessary to specifically distinguish between the first external electrode 3a and the second external electrode 3b, they will be collectively described as an external electrode 3. The external electrode 3 covers not only the end surface C, but also a portion of each of the main surface A and the side surface B close to the end surface C.

As described above, the end of the first lead-out portion 151a of the first internal electrode layer 15a is exposed at the first end surface Ca and electrically connected to the first external electrode 3a. Furthermore, the end of the second lead-out portion 151b of the second internal electrode layer 15b is exposed to the second end surface Cb, and is electrically connected to the second external electrode 3b. This provides a structure in which a plurality of capacitor elements are electrically connected in parallel between the first external electrode 3a and the second external electrode 3b.

Furthermore, the external electrode 3 includes a three-layer structure including a foundation electrode layer 31, a conductive resin layer 32 provided on the foundation electrode layer 31, and a plated layer 33 provided on the conductive resin layer 32.

The foundation electrode layer 31 is provided, for example, by applying and firing a conductive paste including a conductive metal and glass. As the conductive metal of the foundation electrode layer 31, for example, Cu, Ni, Ag, Pd, Ag—Pd alloy, Au or the like can be used.

The conductive resin layer 32 covers the foundation electrode layer 31. The conductive resin layer 32 has any configuration including a thermosetting resin and a metal component, for example. As specific examples of the thermosetting resin, various known thermosetting resins such as epoxy resin, phenolic resin, urethane resin, silicone resin, polyimide resin, and the like can be used. As the metal component, for example, Ag or a metal powder coated with Ag on the surface of the base metal powder can be used.

The plated layer 33 preferably includes plating of one metal or an alloy including the metal selected from the group consisting of, for example, Cu, Ni, Su, Ag, Pd, Ag—Pd alloy, Au, or the like.

Thus, since the conductive resin layer 32 includes a thermosetting resin, for example, the conductive resin layer 32 is more flexible than the foundation electrode layer 31 made of a plated film or a fired product of a conductive paste. Therefore, even when an impact caused by physical shock or thermal cycling to the multilayer ceramic capacitor 1 is applied, the conductive resin layer 32 defines and functions as a buffer layer, such that the generation of cracks in the multilayer ceramic capacitor 1 is prevented, piezoelectric vibration is easily absorbed, and an effect of reducing or preventing the "acoustic noise" is provided.

Figure 6:
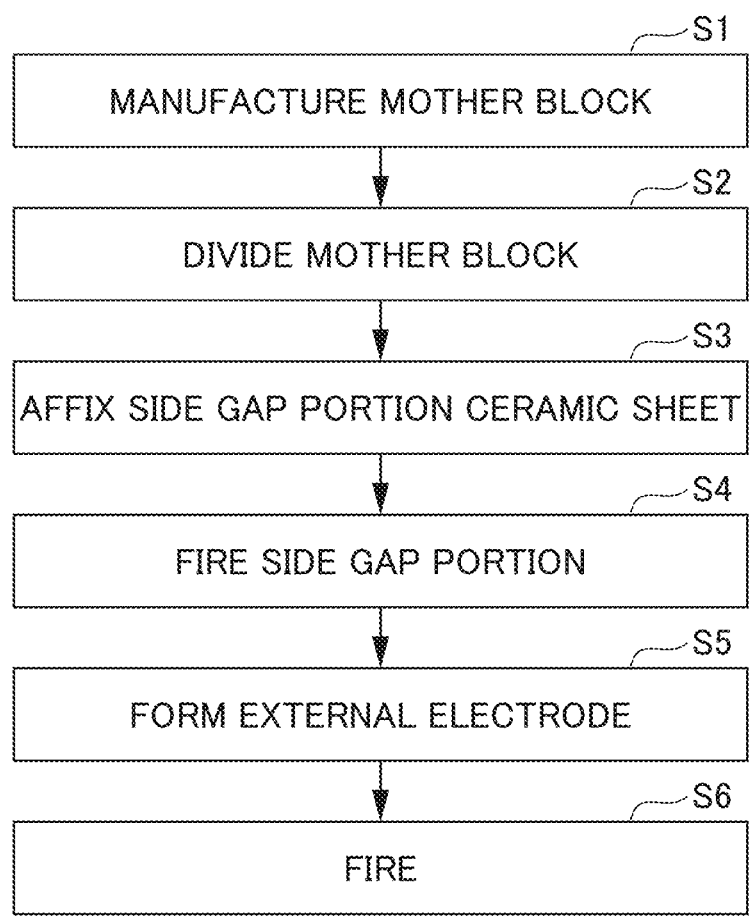
FIG. 6 is a flowchart for explaining a method of manufacturing a multilayer ceramic capacitor according to a preferred embodiment of the present invention.
Figure 7:
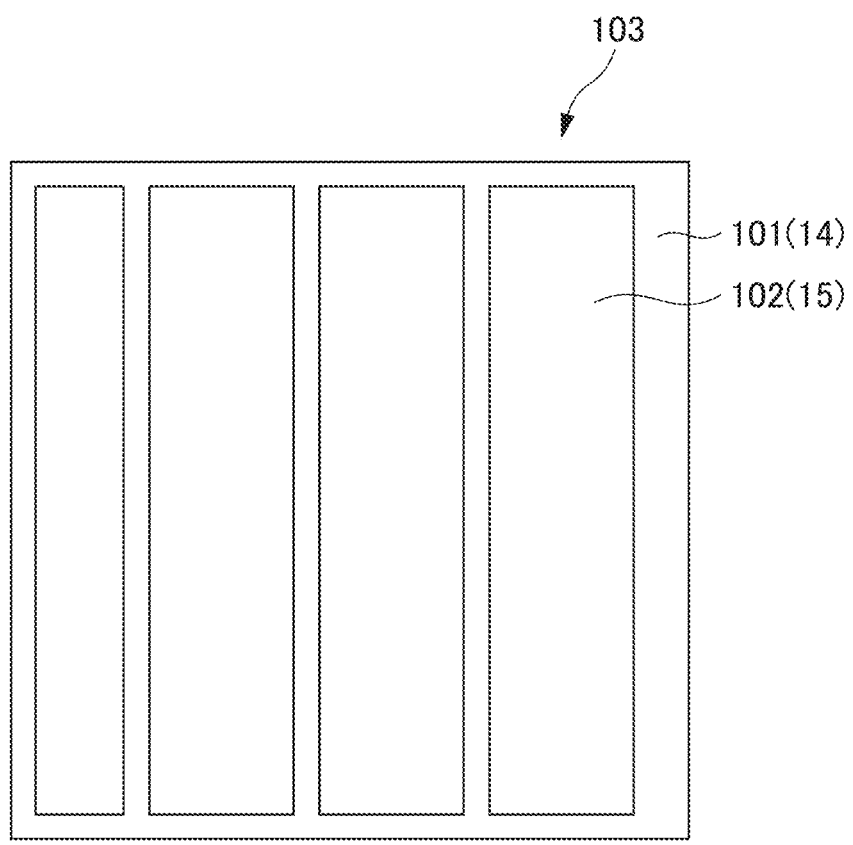
FIG. 7 is a schematic plan view of material sheets.
Figure 8:
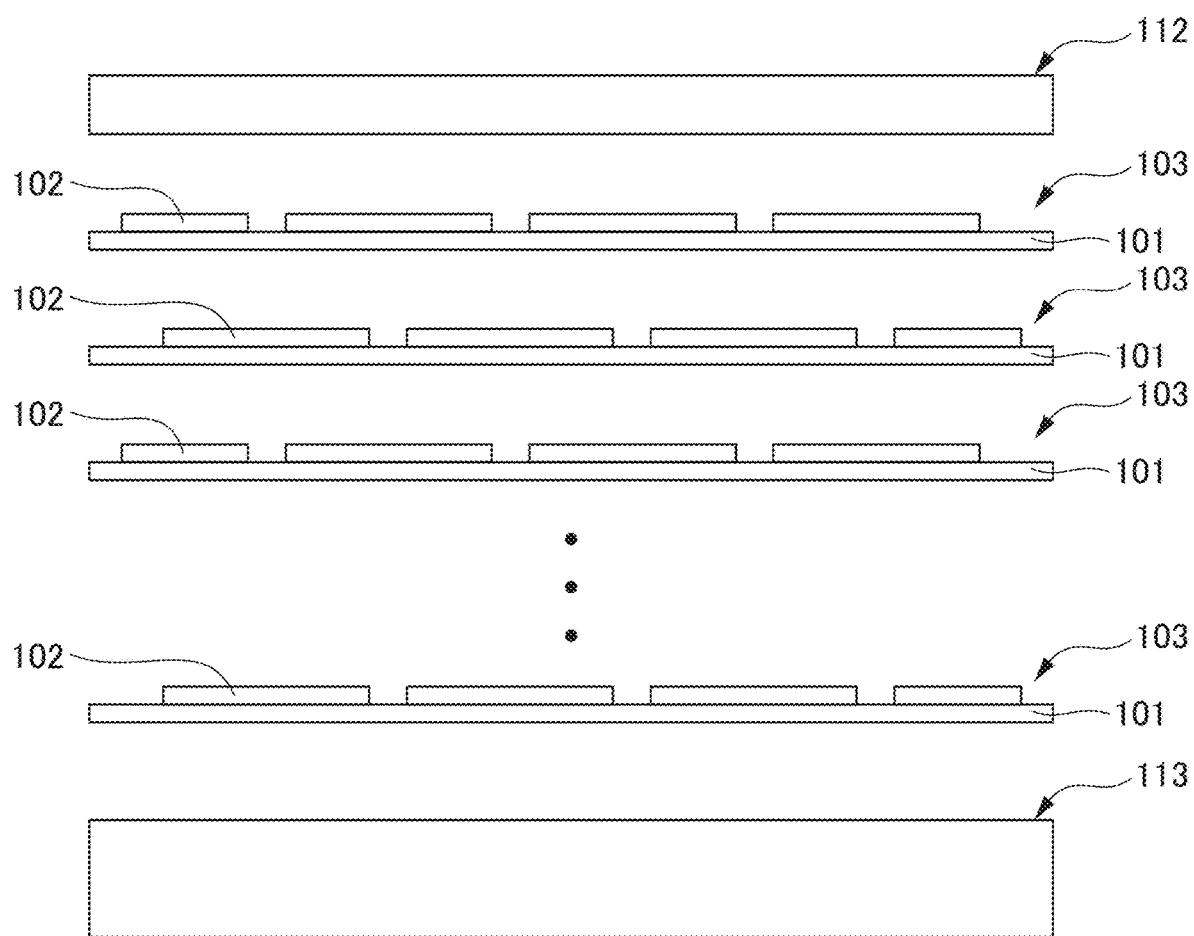
FIG. 8 is a schematic view showing a stacked state of the material sheets.

FIG. 6 is a flowchart for explaining a non-limiting example of a manufacturing method of the multilayer ceramic capacitor 1 and a mounting method to the substrate 200. FIG. 7 is a schematic plan view of material sheets 103. FIG. 8 is a schematic view showing a stacked state of the material sheets 103. FIG. 9 is a schematic perspective view of a mother block 110.

Mother Block Manufacturing Step S1

First, a ceramic slurry including a ceramic powder, a binder and a solvent is prepared. The ceramic slurry is formed in a sheet shape on a carrier film by using a die coater, gravure coater, micro gravure coater, or the like, for example, thus manufacturing a multilayer ceramic green sheet 101.

Subsequently, the conductive paste is printed onto the multilayer ceramic green sheet 101 by screen printing, ink jet printing, gravure printing or the like, for example, so as to have a strip-shaped pattern, thus forming a conductive pattern 102.

Thus, as shown in FIG. 7, the material sheet 103 is provided in which the conductive pattern 102 defining and functioning as the internal electrode layer 15 is printed on the surface of the multilayer ceramic green sheet 101 defining and functioning as the dielectric layer 14.

Subsequently, as shown in FIG. 8, a plurality of material sheets 103 are stacked. More specifically, the plurality of material sheets 103 are stacked such that the strip-shaped conductive patterns 102 are directed in the same or substantially the same direction, and the strip-shaped conductive patterns 102 are shifted by half a pitch in the width direction between the adjacent material sheets 103. Furthermore, an upper outer layer portion ceramic green sheet 112 defining and functioning as the upper outer layer portion 12 is stacked on one side of the plurality of stacked material sheet 103, while a lower outer layer portion ceramic green sheet 113 defining and functioning as the lower outer layer portion 13 is stacked on the other side thereof.

Subsequently, the upper outer layer portion ceramic green sheet 112, the plurality of stacked material sheets 103, and the lower outer layer portion ceramic green sheet 113 are subjected to thermocompression bonding. As a result, the mother block 110 shown in FIG. 9 is formed.

Mother Block Dividing Step S2

Next, as shown in FIG. 9, the mother block 110 is divided along a cutting line X and a cutting line Y intersecting the cutting line X corresponding to the dimension of the multilayer main body 10. As a result, a plurality of multilayer main body 10 shown in FIG. 5 are manufactured. It should be noted that, in the present preferred embodiment, the cutting line Y is orthogonal or substantially orthogonal to the cutting line X.

Here, the multilayer main body 10 that has been cut is pressed in the stacking direction in order to prevent peeling of the stacked dielectric layer 15 in the stacking direction. Then, the internal electrode layer 15, i.e., the center portion or approximate center portion of the first internal electrode layer 15a and the second internal electrode layer 15b in the stacking direction T, is pressed to extend. Therefore, as shown in FIG. 5, in the WT cross-section, the line m shown by a dotted line in the drawings connecting all of the ends in the width direction W of the first internal electrode layers 15a and the second internal electrode layers 15b provided adjacent to each other in the stacking direction T is slightly convex toward the outside.

Side Gap Portion Ceramic Green Sheet Affixing Step S3

Next, a ceramic slurry in which Mg is added as a sintering aid to the same or substantially the same dielectric powder as that of the multilayer ceramic green sheet 101 is produced. Then, a ceramic slurry is applied on the resin film, and dried to produce a side gap portion ceramic green sheet.

Then, by affixing the side gap portion ceramic green sheet on the side portion where the internal electrode layer 15 of the multilayer main body 10 is exposed, the layer is formed as the side gap portion 30.

Side Gap Portion Firing Step S4

The multilayer main body 10 on which the layer which becomes the side gap portion 30 is provided is subjected to degreasing treatment in a nitrogen atmosphere under a predetermined condition, then fired at a predetermined temperature in a nitrogen-hydrogen-steam mixed atmosphere, and sintered to thus include the multilayer body 2.

Here, Mg of the side gap portion 30 migrates to the side of the internal electrode layer 15 during sintering. Thus, after sintering, Mg in the side gap portion 30 is segregated on the side of the inner electrode layer. Furthermore, the dielectric layer 14 and the side gap portion 30 are made of the same or substantially the same material. However, since the side gap portion 30 is affixed to the multilayer main body 10 including the dielectric layer 14, the interface is provided between the side gap portion 30 and the multilayer main body 10 even after sintering.

External Electrode Forming Step S5

Next, at both ends of the multilayer body 2, the foundation electrode layer 31, the conductive resin layer 32, and the plated layer 33 are sequentially formed to provide the external electrode 3.

Firing Step S6

Then, at a set firing temperature, heating for a predetermined time in a nitrogen atmosphere is performed. Thus, the external electrode 3 is fired on the multilayer body 2 to manufacture the multilayer ceramic capacitor 1.

As described above, the multilayer ceramic capacitor 1 according to a preferred embodiment of the present invention has the following advantageous effects.

In the multilayer ceramic capacitor 1, electric power is supplied to the internal electrode layer 15, and an electric field is applied to the dielectric layer 14, a result of which there is a possibility that stress and mechanical strain are generated in the dielectric layer 14, which cause vibration. However, in the multilayer ceramic capacitor 1 of the present preferred embodiment, the lower outer layer portion 13 is thicker than the upper outer layer portion 12 in the stacking direction T. Therefore, the vibration is hardly transmitted to the substrate 200 on which the multilayer ceramic capacitor 1 is mounted, and thus, the occurrence of "acoustic noise" is reduced or prevented.

Here, when mounting the multilayer ceramic capacitor 1 on the substrate 200, in a case in which the multilayer ceramic capacitor 1 is reversed in the vertical direction, the thinner upper outer layer portion 12 is provided close to the substrate 200. Then, the transmission of vibration from the multilayer ceramic capacitor 1 to the substrate 200 is not sufficiently reduced or prevented, and thus the occurrence of "acoustic noise" is not reduced.

However, in preferred embodiments of the present invention, the internal electrode layer 15 is visually recognizable from the outside of the side gap portion 30. With such a configuration, since it is possible to know on which side the thicker lower outer layer portion 13 is provided with respect to the internal electrode layer 15, it is possible to mount the multilayer ceramic capacitor 1 on the substrate 200 without any error in the vertical direction of the multilayer ceramic capacitor 1.

The conductive resin layer 32 includes a flexible thermosetting resin. Therefore, even when an impact caused by physical shock or thermal cycling acts on the multilayer ceramic capacitor 1, the conductive resin layer 32 defines and functions as a buffer layer, and it is possible to prevent cracks in the multilayer ceramic capacitor 1, easily absorb piezoelectric vibration, and further reduce or prevent an "acoustic noise".

Although preferred embodiments of the present invention have been described above, the present invention is not limited to the preferred embodiments, and various modifications can be made within the scope of the present invention.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
    a multilayer body; and
    two external electrodes; wherein
    the multilayer body includes:
        a multilayer main body including an inner layer portion including a plurality of dielectric layers and a plurality of internal electrode layers alternately stacked, a first outer layer portion on one side of the inner layer portion in a stacking direction, and a second outer layer portion on another side of the inner layer portion in the stacking direction;
        two side gap portions on opposite sides of the multilayer main body in a width direction intersecting the stacking direction;
        two main surfaces on opposite sides in the stacking direction;
        two side surfaces on opposite sides in the width direction; and
        two end surfaces on opposite sides in a length direction intersecting the stacking direction and the width direction;
    the two external electrodes each being provided at one of the two end surfaces of the multilayer body, and each extending from the one of the two end surfaces to a portion of one of the two main surfaces;
    a difference in location between ends of side surfaces of two adjacent internal electrode layers of the plurality of internal electrode layers in the stacking direction is about 0.5 µm or less;
    in at least one of the two side gap portions, a portion in contact with the multilayer main body has a thickness of about 15 µm or less;
    a particle size of grains of a dielectric included in each of the two side gap portions decreases from the inner layer portion towards one of the two side surfaces; and
    when dividing each of the two side gap portion into regions each including a dimension of about 20 nm in the width direction, an average particle size of the grains is about 400 nm or more and about 450 nm or less in a region on an outermost side, and about 600 nm or more in a region on an innermost side, and the average particle size of the grains in the innermost region is about 1.5 times or more than the average particle size of the grains in the outermost region.

2. The multilayer ceramic capacitor according to claim 1, wherein an interface is provided between the multilayer main body and each of the two side gap portions.

3. The multilayer ceramic capacitor according to claim 1, wherein magnesium is segregated at a portion of each of the two side gap portions in contact with the plurality of internal electrode layers.

4. The multilayer ceramic capacitor according to claim 1, wherein each of the two side gap portions includes:
    an inner side gap layer in contact with the multilayer main body; and
    an outer side gap layer in contact with the inner side gap layer.

5. The multilayer ceramic capacitor according to claim 1, wherein each of the two external electrodes includes:
    a foundation electrode layer including a conductive metal and a glass component, and in contact with the multilayer body; and a conductive resin layer including a thermosetting resin and a metal component, and in contact with the foundation electrode layer.

6. The multilayer ceramic capacitor according to claim 1, wherein, in a cross section of the width direction and the stacking direction passing through a center or approximate center of the multilayer body, a line connecting the ends at the side surface of two adjacent internal electrode layers among the plurality of internal electrode layers in the stacking direction is convex towards outside.

7. The multilayer ceramic capacitor according to claim 1, wherein the multilayer body includes rounded corners and ridges.

8. The multilayer ceramic capacitor according to claim 1, wherein the multilayer body has a dimension in the length direction is about 0.2 mm or more and about 10 mm or less, a dimension in the width direction is about 0.1 mm or more and about 10 mm or less, and a dimension in the stacking direction is about 0.1 mm or more and about 5 mm or less.

9. The multilayer ceramic capacitor according to claim 1, wherein each of the plurality of dielectric layers has a thickness of about 0.5 μm or less.

10. The multilayer ceramic capacitor according to claim 1, wherein each of the plurality of dielectric layers includes $BaTiO_3$ as a main component.

11. The multilayer ceramic capacitor according to claim 10, wherein each of the plurality of dielectric layers includes at least one of Mn compounds, Fe compounds, Cr compounds, Co compounds, and Ni compounds as a subcomponent.

12. The multilayer ceramic capacitor according to claim 1, wherein each of the plurality of internal electrode layers includes at least one of Ni, Cu, Ag, Pd, Au, or Ag—Pd alloy.

13. The multilayer ceramic capacitor according to claim 1, wherein each of the plurality of internal electrode layers has a thickness of about 0.5 μm or more and about 2.0 μm or less.

14. The multilayer ceramic capacitor according to claim 1, wherein the second outer layer portion is about five times thicker than the first outer electrode portion.

15. The multilayer ceramic capacitor according to claim 1, wherein
a thickness of the first outer layer portion is about 20 μm or more and about 60 μm or less; and
a thickness of the second outer layer portion is about 100 μm or more and about 300 μm or less.

16. The multilayer ceramic capacitor according to claim 1, wherein
a thickness of the first outer layer portion is about 40 μm or less; and
a thickness of the second outer layer portion is about 200 μm or more.

17. The multilayer ceramic capacitor according to claim 1, wherein the second outer layer portion is thicker than the first outer layer portion.

* * * * *